May 20, 1969 E. E. SETZLER 3,444,635
SELF-ADHERING INDEX TAG ASSEMBLY, MULTIPLE
UNIT THEREOF, AND METHOD OF MANUFACTURE
Filed Oct. 24, 1965 Sheet 2 of 4
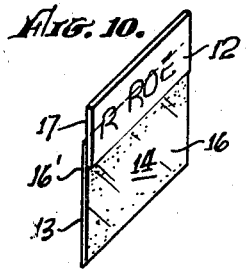
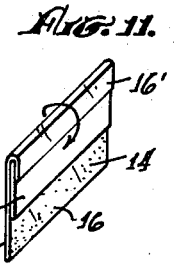
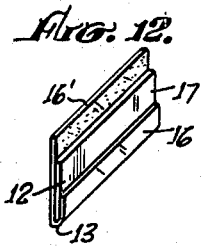
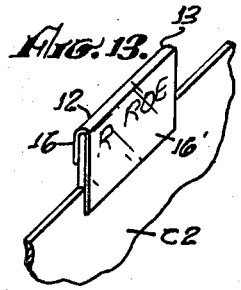
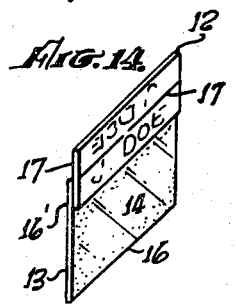
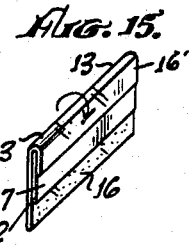
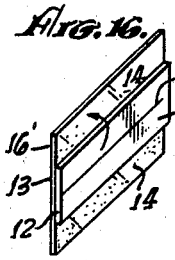
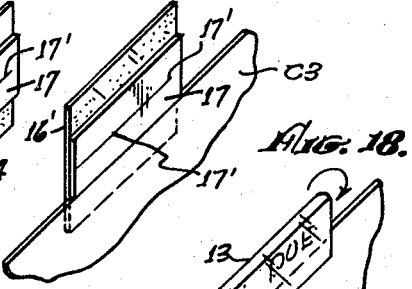
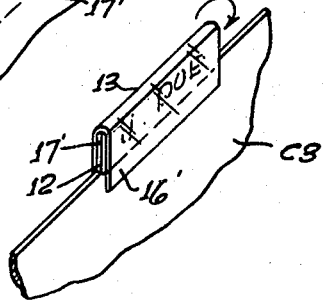
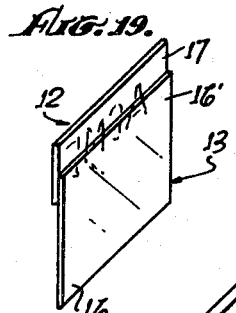
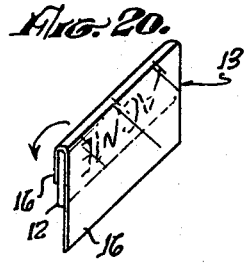
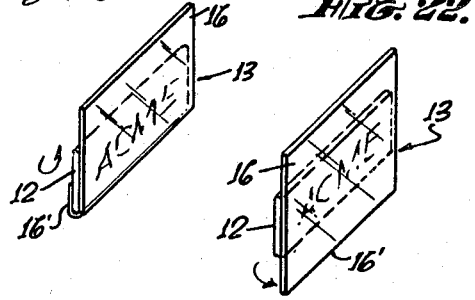
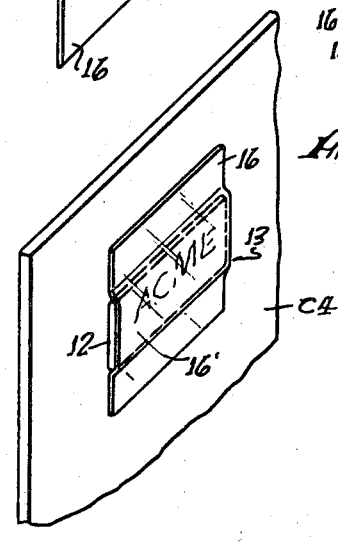
INVENTOR.
Emil E. Setzler,
BY
Harold J. DelVisconte
ATTORNEY.

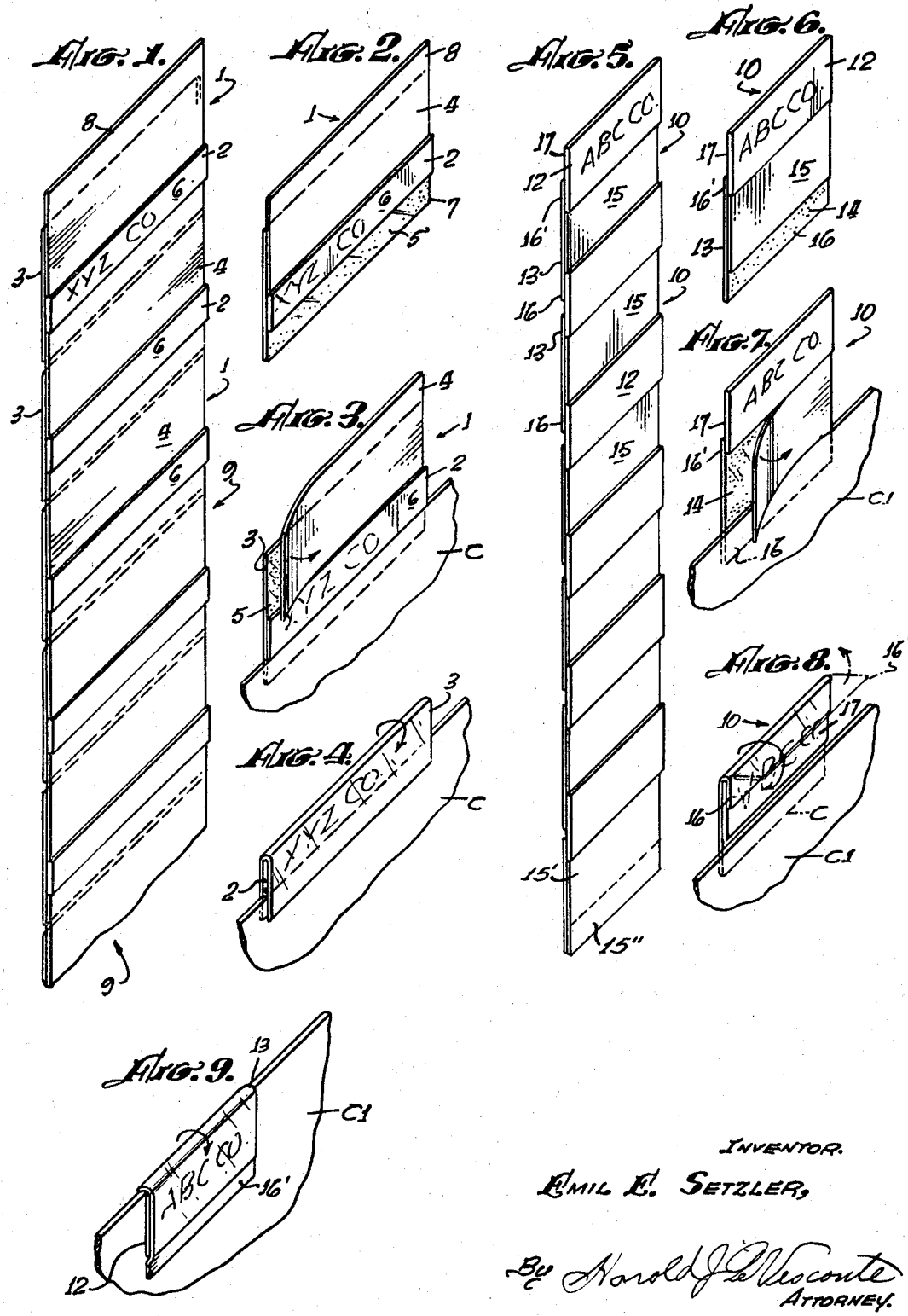

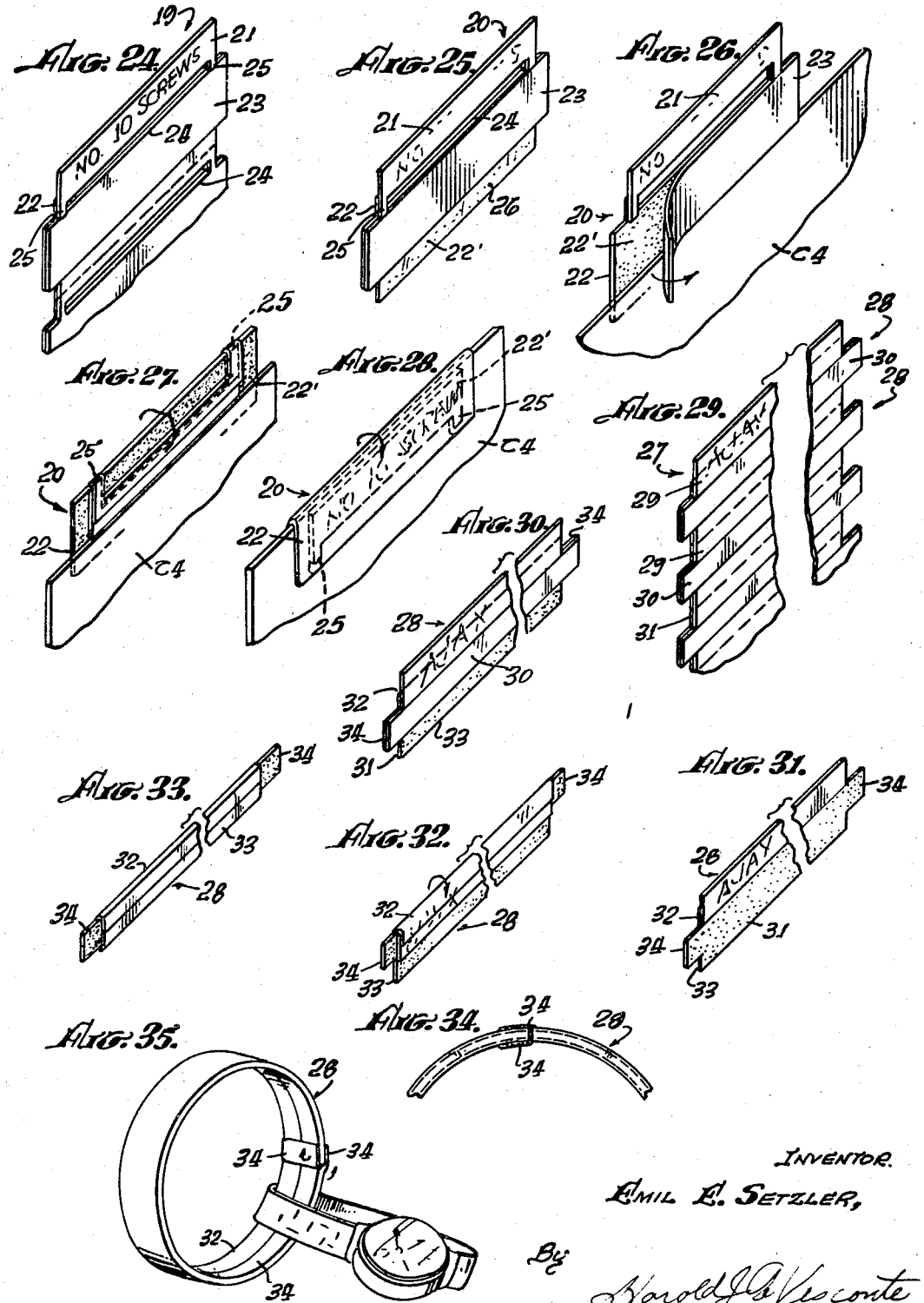

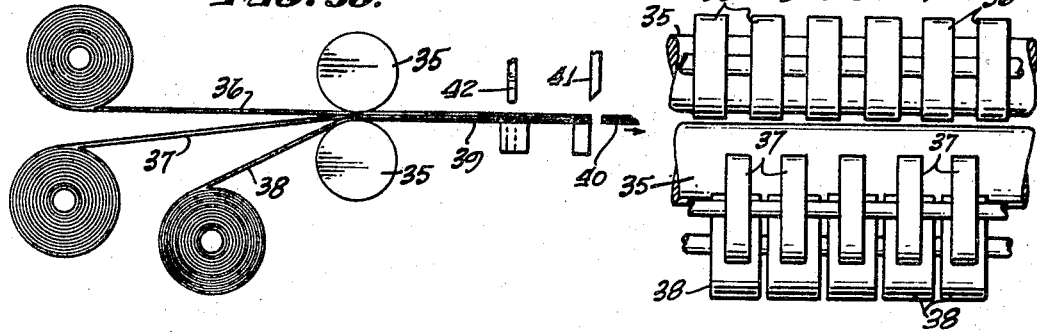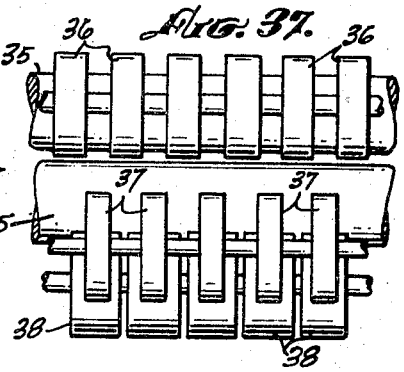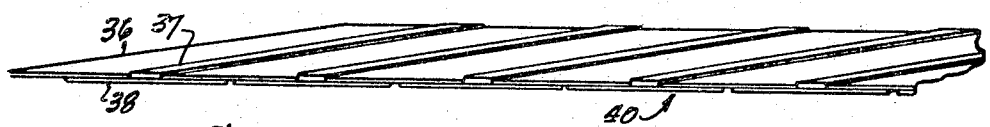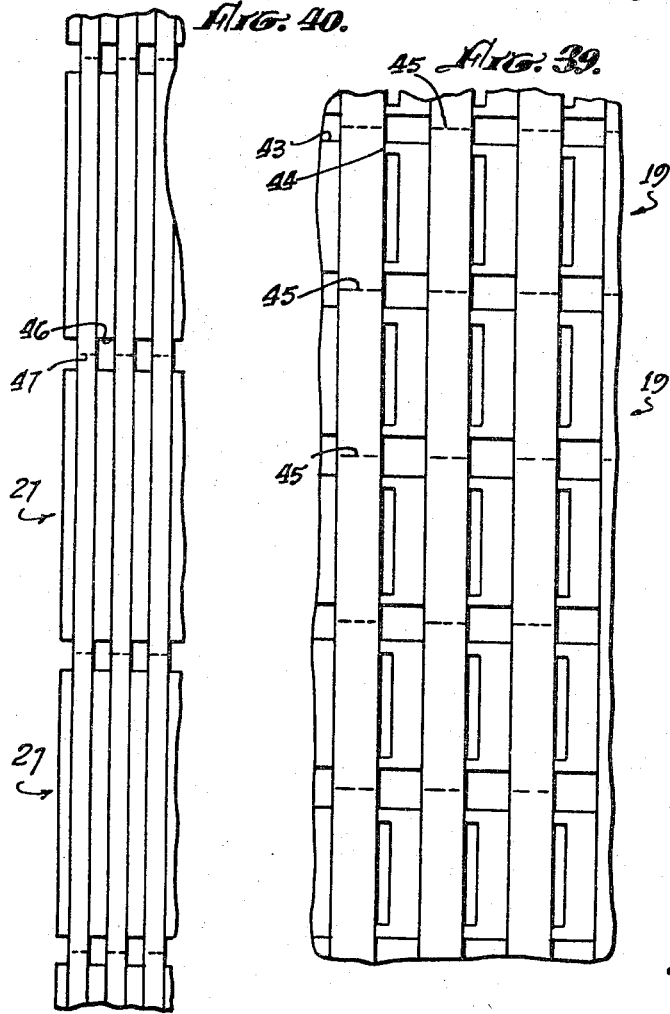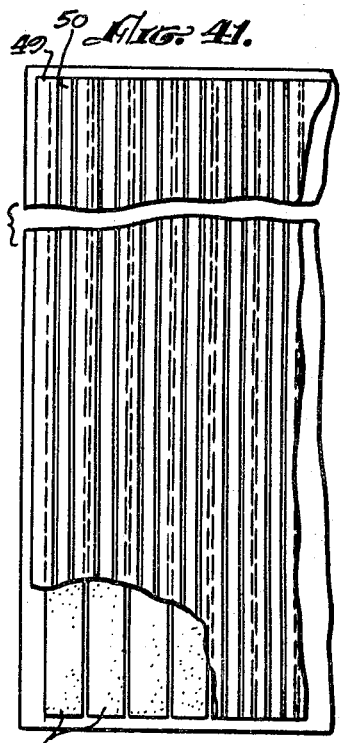

United States Patent Office 3,444,635
Patented May 20, 1969

3,444,635
SELF-ADHERING INDEX TAG ASSEMBLY,
MULTIPLE UNIT THEREOF, AND METHOD OF MANUFACTURE
Emil E. Setzler, 2114 E. Jackson Blvd.,
Medford, Oreg. 97501
Filed Oct. 24, 1965, Ser. No. 504,296
Int. Cl. G09f 3/04
U.S. Cl. 40—2         11 Claims

ABSTRACT OF THE DISCLOSURE

A self-adhering index tag assembly characterized by a component member thereof having a pressure sensitive adhesive surface which serves first to afford an adhesively releasable connection with an adjacent tag in a strip of such tag assemblies and second, as at least part of the means for securing the tag assembly to an article to be identified, as well as the strip comprising a plurality of such tags and the method of manufacture thereof.

---

This invention relates to indexing devices for use with files and other articles and more particularly to improvements in the formation thereof, convenience in application, and in certain modes of manufacture thereof.

The principal object of the invention is to provide an indexing tag assembly in which a flexible transparent component thereof serves the triple purposes of (a) attachment means for the indicia carrying component, (b) a protective cover for the indicia carrying component, and (c) a part of a connecting means by which a plurality of tag assemblies may be formed into a strip of indefinite length and from the end of which strip individual tag assemblies may be detached as needed.

Another object of the invention is to provide an indicia tag assembly which is self-attaching by means of an incorporated surface of pressure sensitive adhesive material and which is capable without change in the component parts thereof, of being attached optionally to the edge of a card or the like, to a surface of the card or the like coincident with an edge thereof, or to any position on such surface other than a portion thereof which is coincident with an edge.

Still another object of the invention is to provide an indicia tag assembly in which incorporated mounting means therefor serves additionally as a protective means for the indicia carrying surface.

A still further object of the invention is to provide an indicia carrying tag assembly means capable of attachment to articles without adhesively engaging the article to be identified thereby.

Still another object of the invention is to provide a method of manufacture of an elongated web comprising suitably associated components forming a plurality of tag assemblies and which web may be severed transversely of the length thereof with resultant formation of individual strips each comprising a plurality of tag assemblies.

With the foregoing objects in view, together with such additional objects and advantages as may subsequently appear, the invention resides in the parts and in the construction, combination and arrangement of parts described, by way of example, in the following specification which discloses certain presently preferred embodiments of tag assemblies and strips of tag assemblies embodying the invention, as well as in certain modes of manufacture also disclosed and illustrated in the accompanying drawings which form a part of said specification. In said drawings:

FIG. 1 is a perspective view of the end portion of a strip comprising a plurality of tag assemblies constituting a first embodiment of the invention, the topmost tag assembly having had indicia applied thereto, FIG. 2 is a perspective view of the topmost tag assembly as initially removed from the upper end of the strip shown in FIG. 1, FIG. 3 shows the first steps in applying the tag assembly shown in FIG. 2 to a card or the like to be identified thereby, FIG. 4 shows the completion of the attachment of the tag assembly to the card, FIG. 5 is a perspective view of a strip formed of a plurality of tag assemblies constituting a second embodiment of the invention, the uppermost tag assembly having had indicia applied thereto preparatory to use, FIG. 6 shows the topmost tag assembly removed from the upper end of the strip, FIG. 7 shows the first steps in the application of the tag assembly shown in FIG. 6 to a card or the like, FIG. 8 shows an intermediate step in the application of the tag assembly, FIG. 9 shows the completion of the attachment of the tag assembly shown in FIG. 6 to a card or the like in which the upper edge of the tag component is coincident with the upper edge of the card, FIGS. 10–13 show another mode of use of the tag assembly shown in FIG. 6 in which the tag component is disposed above the edge of the card to which it is applied, FIG. 10 showing the tag assembly shown in FIG. 6 but with the release member removed, FIGS. 11 and 12 showing intermediate steps in the application of the tag assembly to an index card or the like and FIG. 13 showing the completion of the attachment to the index card, FIGS. 14–18 illustrate the third use of the tag assembly shown in FIG. 6 in which FIG. 14 is similar to FIG. 6 with the release member removed therefrom and the indicia differently applied to the tag component, FIGS. 15, 16 and 17 showing intermediate steps in the application of the tag assembly to the edge of a card and FIG. 18 showing the completion thereof, FIGS. 19–23 show a fourth mode of use of the tag assembly shown in FIG. 6 in which FIG. 19 is similar to FIG. 6 but viewed from the opposite side thereof and the release member having been removed, FIGS. 20, 21 and 22 show intermediate steps in the said fourth mode of application and FIG. 23 shows the final step with the tag assembly applied to a surface of a card or other article, FIGS. 24–28 illustrate a third embodiment of the invention characterized by the enclosure of the ends as well as the sides of the tag component by the cover component of the invention and in which FIG. 24 is a fragmentary view of the upper end of a strip of a plurality of tag assemblies of the said third embodiment, the tag component of the uppermost assembly having had indicia applied thereto, FIG. 25 is a perspective view of the topmost tag assembly shown in FIG. 24. FIGS. 26 and 27 show successive steps in the application of the said third embodiment to the edge of a card or the like, and FIG. 28 is a perspective view of the tag assembly constituting the said third embodiment as attached to a card or the like, FIGS. 29–35 illustrate a fourth embodiment of the invention wherein the tag assemblies are shown as being attachable to articles without adhesive contact with the article itself and in which FIG. 29 is a fragmentary view of the upper end of a strip of a plurality of tag assemblies of the said fourth embodiment of the invention, the tag component of the uppermost tag assembly in the strip having had indicia applied thereto, FIG. 30 is a perspective view of the said uppermost tag assembly of the strip shown in FIG. 29, and FIGS. 31–35 show successive steps in the attachment of the tag assembly to an article of merchandise, FIGS. 36 and 37 illustrate schematically, in side and left hand end elevation, a mode of manufacture of tag assembly strips such as shown in any of the preceding embodiments, said mode of manufacture constituting feeding a plurality of suitable strips from supply rolls through a pair of pinch rollers in the formation of an elongated web which is sheared off in appropriate lengths to form the strips of tag assemblies and which incidental to such formation may also have certain portions thereof punched out, FIG. 38 is a perspective view of a portion of a web as sheared off to form a strip of tag assemblies, said strip being generally similar to that shown in FIG. 1, FIG. 39 is a fragmentary plan view of a web such as formed by means indicated in FIG. 36 having certain portions thereof punched out prior to being sheared into individual strips, the resulting individual strips being of the general type shown in FIG. 24, FIG. 40 is a view similar to FIG. 39 but relating to the formation of strips of tag assemblies of the general type shown in FIG. 29, and FIG. 41 is a fragmentary plan view showing an alternative method of manufacture of webs which may be severed to form tag assembly strips and which method does not require use of pinch rollers or like mechanism.

In the foregoing drawings, for the sake of clearness of illustration and the conservation of space, the various elements of the invention have been shown, for the most part, in much greater thickness than would occur in the actual formation, it being well understood that each of the tag components of a tag assembly would, in general, not exceed, say, .03" in thickness and the transparent cover with its adhesive surface would probably not exceed about .005" while the release member would usually be somewhere between these thicknesses. This recitation of usual thickness dimensions is not to be deemed as a limitation but only to recite the thickness dimensions which would most commonly be found or be employed in index tag assemblies embodying the present invention.

Referring first to FIGS. 1–4, there is shown the simplest embodiment of the invention. Each tag assembly 1 comprises three components including a tag component 2, a cover component 3, and a release member 4, the tag and cover components being hereinafter referred to as "tag" and "cover," respectively. The cover 3 is formed of flexible transparent plastic material having a coating 5 of pressure sensitive adhesive on one surface only thereof. The tag has a front surface 6 on which the desired indicia may be applied by typing, printing or writing and the rear surface of the tag is adhered to the cover by the adhesive coating 5. The three components are of the same width and the combined length of the tag and release member is equal to the length of the cover. At this point it should be mentioned that in this specification the term "length" is used to describe the dimension of the tag assembly and the components thereof which is parallel to the side edges thereof or, in other words, extending in the direction of the longest dimension of the strip formed from a plurality of tag assemblies shown in FIG. 1 to be presently described, the term "width" being reserved for use with reference to the dimension of the tag assembly transverse to the "length" dimension.

Having reference to the position of the components as shown in FIGS. 1–4, the tag is so positioned on the cover 3 that a portion 7 of the cover extends below the tag while the remainder of the cover extends above the tag to an extent that is sufficient to allow the cover to be folded onto the front face of the tag and then extend below the tag to an extent approximately equal to the length of the portion 7 thereof. The release member 4 has a rear face which will adhere to the adhesive surface 5 of the cover but which will pull off cleanly from the adhesive and since the combined length of the release member and tag is equal to the length of the cover, the upper end portion of the release member extends above the upper end of the cover 3 as shown at 8. This permits a strip 9 to be formed of a plurality of tag assemblies with the lower portion 7 of the cover 3 being adhered to the upper portion 8 of the release member of the next lower tag assembly as shown in FIG. 1 and, of course, the length of these strips will be the desired width of the tag.

Assuming that a tag assembly of this first embodiment is to be used, the tag of the uppermost tag assembly in the strip is supplied with the desired indicia (usually by typing) and the tag assembly is removed by peeling the portion 7 of the cover from the rear face of the release member of the adjacent tag assembly, the resulting tag assembly being that which is shown in FIG. 2. The assembly is then attached to the edge of the item to be identified thereby, for example, the card C by first abutting the lower end of the tag 2 against the edge of the card (see FIG. 3) which positions the exposed adhesive portion at the rear of the card and pressure being applied to cause the adhesive portion 7 to be adhered to the rear face of the card. The release member is then removed as indicated in FIG. 3 and the thus exposed adhesive coated front surface of the cover is then bent downward over the front face of the juxtaposed tag and card (see FIG. 4) and adhered to said front faces by pressure.

It is to be noted that in the entire operation it is unnecessary for the user to come into contact with the adhesive surface and that the lower end of the tag serves as a guide correctly positioning the tag in abutment with the edge of the card and in perfect alignment with the card edge. Moreover, the transparent plastic material of the cover makes a wear resisting surface for the thus formed index tab. Still further, the release member serves the added function of being the releasable connecting member between adjacent tag assemblies in the formation of the strip shown in FIG. 1.

FIG. 6 shows a tag assembly 10 comprising a second embodiment of the invention, a plurality of said tag assemblies being shown as comprising a strip 11 shown in FIG. 5. Each tag assembly 10 comprises a tag 12, a flexible transparent cover 13 having a pressure sensitive coating 14 on one face only thereof and a release member 15. This tag assembly differs in that the tag and release members are reversed as compared with the first embodiment. In this embodiment, as in all embodiments, the combined length of the tag and release member of the tag assembly are equal to the length of the cover member and the tag and release member are so disposed relative to the cover member of each tag assembly that a portion 16 of the lower end of the cover adhesive surface 14 is exposed for use, e.g., attachment to a card C1, upon removing the tag assembly from the strip, while the upper portion of the rear face of the tag in each assembly upon removal from the strip extends above the upper end of the cover member. Consequently, as distinguished from the first embodiment, the tag element of the juxtaposed tag assemblies is the connecting member adhered to the juxtaposed portions of adjacent cover members and consequently both for this purpose as well as for another purpose to be later described, the rear surface 17 of the tag is treated to act as a release member and to separate cleanly from the adhesive surface 14 of the cover. It will be noted that in this embodiment, in the formation of the strip of tag assemblies, the lowermost release member is slightly longer to cover the otherwise exposed lower edge of the cover as shown at 15'. Alternatively, a narrow added release strip 15 of the same character as the release member 15 may be used instead of a wider strip as indicated by the dotted line crossing the release member 15'.

These tag assemblies of the second embodiment are capable of a wide variety of uses and FIGS. 6 through 9 show a use in which the tag assembly is attached to a card file or the like with the upper end of the tag disposed coincident with the upper edge of the card. Assuming that the tag 12 of the tag assembly 10 at the uppermost end of the strip shown in FIG. 5 has had the desired indicia applied thereto and that the tag assembly has been removed from the strip as shown in FIG. 10, the tag assembly is fixed to the upper edge of an indicia card C1 by positioning the tag assembly with the exposed adhesive surface of the lower portion 16 of the cover 13 at the rear of the card with the lower end of the release member 15 abutting the upper edge of the card as shown in FIG. 7. The release member 15 is then removed as indicated in FIG. 7 and discarded. The tag 12 is then folded down so that the front face thereof to which the indicia has been applied is adhered to the adhesive surface of the cover immediately above the edge of the card as shown in FIG. 8 in full lines. Referring to FIG. 7 again, the width of the adhesive surface of the cover exposed by removal of the release member is slightly greater than the length of the release member to provide the extra length required for the cover to be bent over the end of the tag and for further bending presently to be described, it being noted in FIG. 8 that the end of the inverted tag is spaced slightly from the adjacent edge of the card. It has been previously mentioned that the rear face of the tag in this embodiment of the invention is of the same character as the release member so that the cover may be readily detached therefrom and it has been noted that this property first assists in the formation of the strip and the removal of tag assemblies from the upper end of the strip. This quality of the rear face of the tag has a further function in that as shown in FIG. 8, after the tag has been folded down against the exposed adhesive surface of the cover, the upper portion 16' of the cover which has remained adhesively attached to the lower portion of the tag, is now detached from the tag as indicated in dotted lines in FIG. 8, the front face of the tag remaining adhered to the cover. The tag is then folded down across the front face of the card as shown in FIG. 9 and the portion 16' which has been removed from the back of the tag (see FIG. 8) is straightened out and adhered to the card below the tag thus securely adhering the tag to the front face of the card. The previously mentioned space between the adjacent edges of the tag and the top edge of the card shown in FIG. 8 provides sufficient slack in the cover to extend across the then upper ends of the tag and the abutting edge of the card to permit this folding operation to be completed without bending or otherwise deforming the adjacent portions of either the tag or the card. As in the first embodiment of the invention, the tag is readily applied and when applied presents a neat, wear resisting appearance.

A second mode of use of a tag assembly of the type shown in FIG. 6 is illustrated in FIGS. 10–13. In this use the tag assembly has the indicia applied as before and is removed from the strip. The release member is removed and the tag element is then folded down against the adhesive surface of the cover strip as shown in FIG. 11 with resultant inversion of the indicia as indicated in dotted lines. The upper end 16' of the cover is then detached from the rear face of the tag 11 and the lower portion 16 of the cover is folded up against the rear end of the tag as shown in FIG. 12. As shown in this figure, the tag ready for attachment to a card C2 is in inverted position. Referring finally to FIG. 13, the tag has been restored to upright position and has been attached to the card C2 by adhering the exposed adhesive surface of the end portion 16' of the cover to the front face of the card.

FIGS. 14–18 show a third mode of use of tag assemblies such as shown in FIG. 6. The tags are preferably scored to permit bending at their midlength as indicated by dotted line 17' in FIGS. 16 and 17 and as a general matter, the tag components for tag assembly units would always have this score line since it does not interfere with the other uses and permits this additional use of the tag assemblies. Referring first to FIG. 14, the exposed face of the tag 12 has the indicia applied adjacent to the upper and lower ends thereof in reverse relation to each other. This shows the tag removed from the strip and with the release member removed. Referring next to FIG. 15, the tag has been folded down against the adhesive surface of the cover 13 similar to the folding shown in FIG. 11. In FIG. 16, the upper end 16' of the cover 13 has been detached from the rear face of the tag 12 and the lower portion 16 of the cover 13 has been attached to the face of a card C3 with the adjacent end of the tag abutting the upper edge of the card. The final step in the attachment of the card is shown in FIG. 18 in which the tag assembly has been folded along the scored line 17' of the tag 12 bringing the portion 16' into contact with the face of the card opposite that contacted by the portion 16 thus attaching the tag assembly to the edge of the card with the indicia both protected and exposed to view on both sides of the card.

FIGS. 19–23 show still another mode of use of tag assemblies such as disclosed in FIGS. 5 and 6. In FIG. 19 the tag assembly is shown with the release member removed and as viewed from the side opposite that shown in FIGS. 10 and 14 with the applied indicia accordingly being shown in reverse. In FIG. 20 the tag has been folded down into adhesive contact with the adhesive surface of the cover 13 and in FIG. 21, the thus folded tag is shown as having been revolved a half revolution so that the indicia on the tag is right side up. In FIG. 22, the edge portion 16' of the cover has been detached from the rear face of the tag and this figure accordingly is generally similar to FIG. 16 except being shown from the front instead of the rear face of the tag assembly. In FIG. 23, the tag is shown as applied to the front surface of a sheet of paper C4 or, for that matter, to any surface to which the adhesive face of the cover 13 will adhere.

In the preceding two forms of the invention and in the uses thereof, it is to be noted that the ends of the tag are exposed. The form of the invention shown in FIGS. 24–28 provides a means involving the general principles of the invention and in which, additionally, the side edges of the tags are enclosed by providing a cover which is of greater width than the tag.

FIG. 24 shows a strip 19 comprising a plurality of tag assemblies 20 in which as in FIG. 5, the tag component is the connecting link between adjacent and successive tag assemblies. Each tag assembly comprises a tag 21, a flexible transparent cover 22 provided with a pressure sensitive coating 22' on one side only thereof and a release member 23. The release member is of slightly greater length than the tag and is also of greater width, projecting beyond the opposite sides of the tag. The manner of economically achieving this result will be disclosed in the description of certain modes of manufacture hereinafter to be described. Each tag assembly has an elongated slot 24 extending therethrough the slot being located at the lower edge of the tag 21 and being coincident with the upper edge of the release member. The slot 24 is of slightly less width than the tag, extends through the cover 22 and forms leg portions 25, 25 at each lower end of the tag 21.

Assuming that a tag assembly 20 has had indicia applied to the tag 21 thereof and has been removed from the strip as shown in FIG. 25, the first step in applying the tag to a card C4 or the like to be identified thereby comprises adhering the exposed lower end 26 of the cover 22 to the rear face of the card or the like C4 and removing the release member 23 as shown in FIG. 26. The tag is then folded down against the adhesive surface of the cover 22 as shown in FIG. 27. This is the same step as is shown in FIG. 8. The upper end 26 of the cover is then detached from the rear face of the tag in the same manner as is indicated in FIG. 8 and the tag folded down over the card as shown in FIG. 28. Since the portion of the cover to which the face of the tag has been adhered is wider than the tag, the edge overlapping portions of the cover are adhered to the surface of the card at the side edges of the tag and the portion of the cover extending over the portions 25, 25 of the tag formed by the slot 24 also seals the lower end of the tag and all edges of the tag are thus enclosed and sealed.

Referring next to FIGS. 29–35 there is shown still another embodiment of the invention. FIG. 29 shows a strip of tags useful in this embodiment of the invention which are like the tags shown in FIGS. 24 and 25 with the exception that the slot 24 is omitted. In this embodiment of the invention, the strip 27 is formed by a plurality of tag assemblies 28 such as shown in FIG. 30 and in the strip, the tags 29 are of less width than the release members 30 and the strip is formed by the tags forming the connecting link between adjacent covers 31. Since usually in this form of the invention the tag assemblies are of considerable length, the various figures are shown with center portions thereof broken away to conserve space.

Assuming that a tag assembly 28 has had the indicia applied to the front face of the tag 29 thereof and has been removed from the strip 27 as indicated in FIG. 30, the release member 30 is removed leaving th tag assembly in the form shown in FIG. 31 attached to the upper edge 32 of the cover 31 which is approximately half the length dimension of the tag 29. The lower portion 33 of the cover 31 is also approximately half the length dimension of the tag. The center portion of the cover is of greater width dimension than the tag and projects beyond the side edges of the tag in flap portions 34, 34. After removal of the release member, the tag is first folded down against the adhesive surface of the cover as shown in FIG. 32. The lower portion 33 is then folded up against the rear face of the tag as shown in FIG. 33 wholly enclosing the tag within the cover. This elongated tag with the indicia protected by the cover 31 may now be bent into the loop with the ends secured together by first folding one of the flaps 34 over the joined edges of the portions 32 and 33 of the cover and adhering the other flap portion 34 to the outer face of the opposite end of the tag assembly. In so doing, the tag thus formed into a loop would be associated with an article of merchandise as indicated, for example, in FIG. 35 wherein the tag is shown associated with a wrist watch. Obviously it could be thus attached to almost any article of merchandise. Additionally, while not shown in these figures, after the tag has been folded in the position shown in FIG. 32, it is believed to be completely obvious that after the tag has been folded down in the form shown in FIG. 32, the upper portion 32 of the cover can be detached from the rear face of the tag and the resulting tag attached to a surface in the manner shown in FIG. 23 with the added advantage that the ends of the tag will also have been sealed by the flap portions 34, 34.

FIGS. 36 and 37 are diagrammatic views of a mode of manufacture of index devices shown in the preceding figures comprising a pair of pinch rollers 35, 35 between which a plurality of alternate strips of release member 36 and tag material 37 are brought into superposed contact with the adhesive coated surface of strips of cover material 38, all of said strips being supplied by rolls of material of appropriate width as indicated in FIG. 37. The resulting web of material 39 may be sheared off in appropriate widths to form strips 40 by a shear means 41, and, if desired, the strips may be first subjected to having certain portions thereof punched out by a punch means indicated at 42.

FIG. 38 shows a portion of a strip 40 as sheared off in which the tag elements 37 are of relatively short length as compared with the cover elements 38 and the release member 36 serves as the connecting link between adjacent tag assemblies as in the form of the invention shown in FIGS. 1 and 2, the relative length of the tag assembly and the associated cover being somewhat different than that shown in FIGS. 1 and 2 to indicate that these proportions may vary according to the need of a particular use.

FIG. 39 shows the punching operation for the production of tag assembly strips such as shown in FIG. 24. The web as produced by the pinch rolls 35, 35 and the associated rolls or strips of material has portions of the associated tag and cover punched out as shown at 43 to provide the side flaps which overlap the ends of the tag elements in application to a surface and as shown at 44 to provide the space over which the cover element overlaps the lower edge of the tag assembly in use. The shear cuts 45 separating successive strips of tag assemblies 19 extend through the release members and the associated portions of the cover at approximately the midwidth of the punched out openings 43.

FIG. 40 similarly shows the formation of tag assembly strips 27 such as shown in FIG. 29 in which successive strips have the associated portions of the tag and cover components punched out as at 46 to provide the extent by which the cover overlaps the ends of the tag in forming the flap portions 34. The shear cuts 47 which separate the successive strips of tag assemblies are at about the midwidth of the punched out portions 46 to provide an equal overlap for uniform flap portions 34 in the resulting tag assemblies.

Finally, FIG. 41 shows still another mode of manufacture of index devices embodying the present invention which does not require the use of mechanism such as indicated in FIGS. 36 and 37, the mechanized form, admittedly, being more efficient and economical. In this mode of manufacture, a plurality of adhesive cover elements 48 are secured in edge to edge relation on a table or similar surface with the adhesive side up. After this has been completed, alternate strips of tag material 49 and release member material 50 on the cover strips and pressed down to effect the adherence thereof to the cover strips after which, the thus formed sheet of assembled material can be cut off at desired lengths to form the strips of tag assemblies. If desired, of course, this web of assembled strips of material can first be introduced to a punch press mechanism to form the desired punched out portions. This particular mode of manufacture is admittedly less efficient than that shown in FIGS. 36 and 37 but is particularly adapted for the formation of small quantities of those forms of the invention for which the existing mechanism may not be adapted or cannot be reset or adjusted economically to produce.

It will be understood that the sizes and shapes and relative proportions of the tag, cover and release components are not limited and may be of such length and with as may best serve particular individual proposed uses and that, moreover, these tag assemblies and strips thereof may be formed in any desired manner such as by automatic or semiautomatic mechanism generally indicated in FIGS. 36 and 37 or if desired, in small quantities by a hand operation such as indicated in FIG. 41. With these factors in mind, it will be appreciated that the invention is not necessarily limited to the precise details of construction and usage disclosed, by way of example, in the foregoing specification and accordingly, it will be understood that the invention includes as well all such changes and modifications in the parts and in the construction, combination and arrangement of parts as well as changes and modifications in the mode of manufacture thereof as shall come within the purview of the appended claims.

I claim:

1. An index tag assembly for attachment to an article to be identified thereby, said tag assembly comprising a flexible, transparent cover having one side only thereof coated with a pressure sensitive adhesive, a tag having one side surface thereof initially exposed for reception of indicia and the opposite side surface thereof adhered to said adhesive coated side of said cover, and a disposable release member having a surface capable of adhesion to said pressure sensitive adhesive and of being removed therefrom without impairment of the adhesive surface of said cover, said tag and said release member being arranged in end-to-end relation with the said surface of said release member and the side of said tag opposite the indicia receiving side thereof adhered to said pressure sensitive surface and so disposed on said cover that the end of said release member which is remote from said tag projects beyond the adjacent end edge of said cover.

2. An index tag assembly for attachment to an article to be identified thereby, said tag assembly comprising a flexible, transparent cover having one side only thereof coated with a pressure sensitive adhesive, a tag having one side surface thereof initially exposed for reception of indicia and having the opposite side surface thereof adhered to said adhesive coated side of said cover and a disposable release member having a surface capable of adhesion to said pressure sensitive adhesive and of being removed therefrom without impairment of the adhesive surface of said cover, said tag and said release member being arranged in end-to-end relation with the said surface of said release member and the side of said tag opposite the indicia receiving side thereof adhered to said pressure sensitive surface and so disposed on said cover that an end portion of said adhesive coated surface of said cover is exposed by being extended beyond the end of said tag which is remote from said release member and so that a portion of said release member extends beyond the opposite end of said cover.

3. An index tag assembly as claimed in claim 2 in which said release member is of greater length than said tag, in which said exposed portion of said adhesive coated side of said cover affords means of initial attachment of said assembly to a card-like article to be identified by the indicia on said tag, and in which, upon removal of said release member therefrom, said cover may be folded over said indicia receiving surface of said tag with said adhesive surface thereof adhered to and covering said indicia receiving surface and additionally adhered to the opposite face of the card-like article.

4. An index tag assembly for attachment to an article to be identified thereby, said tag assembly comprising a flexible, transparent cover having one side only thereof coated with a pressure sensitive adhesive, a tag having one side surface thereof initially exposed for reception of indicia and having the opposite side surface thereof adhered to said adhesive coated side of said cover and a disposable release member having a surface capable of adhesion to said pressure sensitive adhesive and of being removed therefrom without impairment of the adhesive surface of said cover, said tag and said release member being arranged in end-to-end relation with the said surface of said release member and the side of said tag opposite the indicia receiving side thereof adhered to said pressure sensitive surface and so disposed on said cover that an end portion of said adhesive coated surface of said cover is exposed by being extended beyond the end of said release member which is remote from said tag and so that a portion of said opposite face of said tag extends beyond the opposite end of said cover.

5. An index tag assembly as claimed in claim 4 in which said exposed portion of said adhesive coated side of said cover affords means of initial attachment of said assembly to a surface of an article to be identified by the indicia on said tag, in which the length of said release member is not less than the length of said tag, and in which, upon removal of said release member, said cover may be folded to bring the indicia receiving face of said tag into contact with said adhesive surface and disposed at the side of the article to be viewed for identification by said tag assembly.

6. As an article of manufacture, a strip comprising a plurality of releasably adhesively interconnected index tag assemblies, each of said assemblies comprising a flexible, transparent cover having one side only thereof coated with a pressure sensitive adhesive, a tag having one face thereof adhered to said coating and having the opposite face thereof available for the reception thereon of desired indicia, and a disposable release member having an adhesive release surface on one side thereof adhered to said coating adjacent to one end of said tag; said release member and said tag being so disposed on said cover as to project beyond said cover at one end of said cover and to leave a portion of said adhesive surface adjacent the opposite end of said cover projecting beyond and adhesively engaging the component of the adjacent tag assembly which extends beyond the cover of that tag assembly whereby the covers of the tag assemblies in said strip are releasably united to form said strip by certain of the components of the assemblies.

7. As an article of manufacture, a strip of index tag assemblies as claimed in claim 6 in which the tag of each tag assembly projects beyond the adjacent end portion of the associated cover and in which the surface of said tag engaged by the adhesive surface of said cover is adapted for releasable engagement with the adhesive surface of the projecting portion of the cover of the adjacent tag assembly.

8. As an article of manufacture, a strip of index tag assemblies as claimed in claim 6 in which the release member of each tag assembly projects beyond the adjacent end portion of the associated cover and is adapted for engagement by the adhesive surface of the projecting portion of the cover of the adjacent tag assembly.

9. An index tag assembly for attachment to an article to be identified thereby, said tag assembly comprising a flexible, transparent cover having one side only thereof coated with a pressure sensitive adhesive, a tag having one side surface thereof initially exposed for reception of indicia and having the opposite side surface thereof adhered to said adhesive coated side of said cover, and a disposable release member having a surface capable of adhesion to said pressure sensitive adhesive and of being removed therefrom without impairment of the adhesive surface of said cover, said tag and said release member being arranged in end-to-end relation with the said surface of said release member and the side of said tag opposite the indicia receiving side thereof adhered to said pressure sensitive surface and so disposed on said cover that the end of said release member which is remote from said tag extends beyond the adjacent end of said cover; the side surface of said tag opposite said indicia receiving side surface thereof being capable of being adhered to said pressure sensitive adhesive and of being removed therefrom without retention of the adhesive thereon.

10. In the manufacture of a strip comprising a predetermined number of releasably adhesively interconnected index tag assemblies which are releasably interconnected by the adhesive means which thereafter serves to connect the individual tags to the objects to be identified thereby and in which each of the tag assemblies is composed of a tag, a disposable release member, and a transparent flexible cover having one side only thereof coated with a pressure sensitive adhesive, and in which the adhesive coating on the covers of the tag assemblies in the strip serve as the interconnecting means which unit the tag assemblies in the strip, the method which comprises forming an elongated web from lengths of materials of the components of said predetermined number of tag assemblies arranged in the parallel relation said tag assemblies occupy in the strip, and then cutting off a portion from the end of said web equal to the desired width of the tag assemblies comprising the resulting strip.

11. As an article of manufacture, a strip comprising a plurality of index tag assemblies releasably adhesively connected together in end-to-end relation to form the said strip and each of said tag assemblies comprising a flexible transparent cover having one side only coated with a pressure sensitive adhesive, a tag component having one side surface susceptible of receiving indicia, and a disposable release member, said tag component and said release member being adhered to said coated side of said cover component, and in which said cover component serves both as the means for securing the tag assembly of which it is a part to an article to be identified and is available to serve as a part of the means by which the tag assembly of which it is a part is releasably adhesively connected in said end-to-end relation in the formation of said strip.

References Cited

UNITED STATES PATENTS

| | | |
|---|---|---|
| 2,893,144 | 7/1959 | Cunningham ____ 40—2 X |
| 3,054,202 | 9/1962 | Scholfield ____ 40—2 X |
| 2,699,103 | 1/1955 | Stasikewich. |
| 3,245,162 | 4/1966 | McElroy. |
| 3,299,556 | 1/1967 | Stiefel. |

EUGENE R. CAPOZIO, *Primary Examiner.*

WENCESLAO J. CONTRERAS, *Assistant Examiner.*

U.S. Cl. X.R.

40—360

UNITED STATES PATENT OFFICE
CERTIFICATE OF CORRECTION

Patent No. 3,444,635 May 20, 1969

Emil E. Setzler

It is certified that error appears in the above identified patent and that said Letters Patent are hereby corrected as shown below:

Column 4, line 65, "strip 15" should read -- strip 15″ --.

Signed and sealed this 14th day of April 1970.

(SEAL)
Attest:

Edward M. Fletcher, Jr.
Attesting Officer

WILLIAM E. SCHUYLER, JR.
Commissioner of Patents